Nov. 24 1925.
H. S. JANDUS ET AL
1,562,453
BUMPER FOR AUTOMOBILES
Filed Jan. 28, 1924
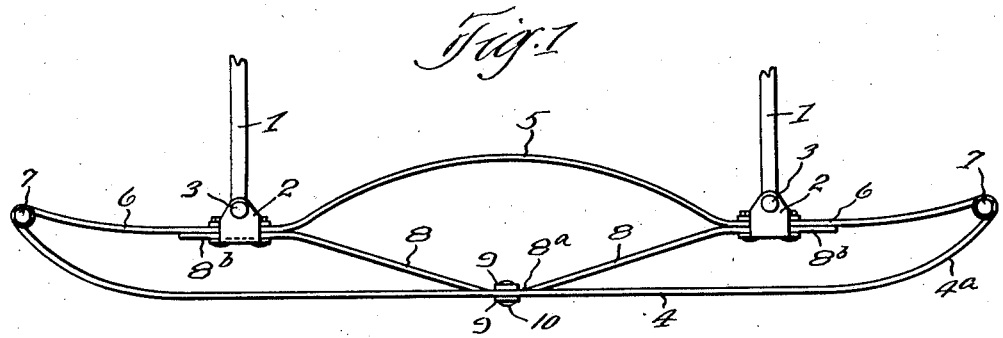
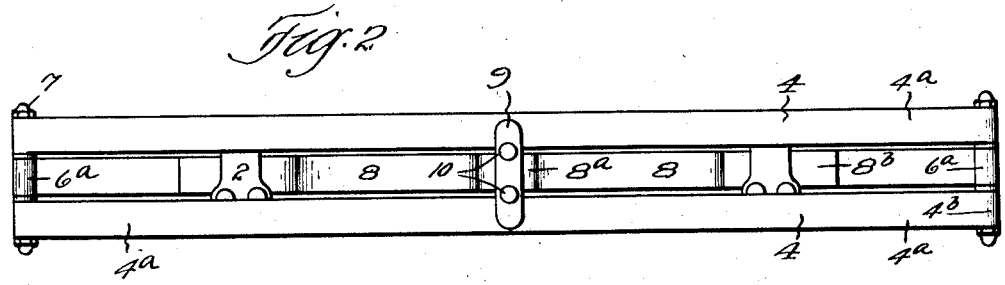
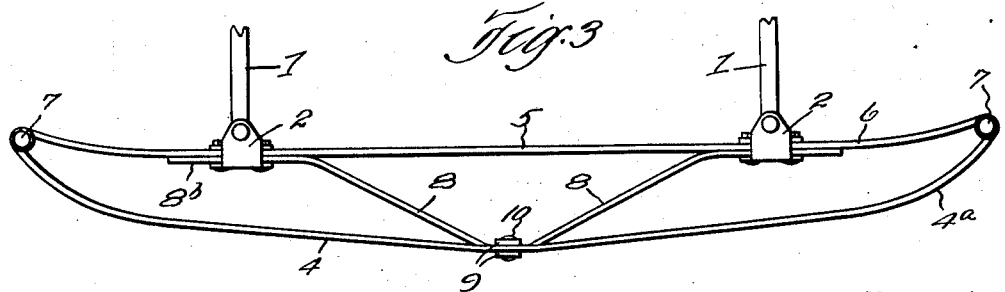
Inventor Patented Nov. 24, 1925.

1,562,453

UNITED STATES PATENT OFFICE.

HERBERT S. JANDUS AND CREMER F. BROWN, OF DETROIT, MICHIGAN, ASSIGNORS TO THE C. G. SPRING & BUMPER COMPANY, OF DETROIT, MICHIGAN, A CORPORATION OF DELAWARE.

BUMPER FOR AUTOMOBILES.

Application filed January 28, 1924. Serial No. 688,992.

*To all whom it may concern:*

Be it known that we, (1) HERBERT S. JANDUS and (2) CREMER F. BROWN, citizens of the United States, residing at (1) Detroit, in the county of Wayne and State of Michigan, and (2) Detroit, in the county of Wayne and State of Michigan, have invented a certain new and useful Improvement in Bumpers for Automobiles, of which the following is a full, clear, and exact description, reference being had to the accompanying drawings.

This invention relates to bumpers for automobiles and like vehicles, and has for its general object to provide a bumper which is particularly adapted to withstand and absorb severe impacts without injury to the automobile and the occupants thereof. Further and more limited objects of the invention will appear in connection with the detailed description of the same; and the objects of the invention will be realized generally in and through the combinations of elements set forth in the claims hereof.

In the drawings forming part hereof, Fig. 1 represents a plan view of a bumper constructed in accordance with our invention; Fig. 2 a front elevation thereof; and Fig. 3 a view, similar to Fig. 1, of a modification of the invention.

Describing the various parts by reference characters, 1 denotes a pair of bumper-supporting arms. Each of these arms is connected by means of a clamping device 2 and a pivot bolt 3 to a pair of bumper bars. The clamp is preferably of the construction shown and described in the patent to McGregor, Reissue No. 15,545, dated February 20, 1923.

The bumper shown herein comprises a pair of front or impact bars 4, the said bars being vertically spaced and having rearwardly directed ends $4^a$, each having an eye $4^b$.

A rear or auxiliary bar is connected to and between the ends $4^b$ of the front or impact bars. This rear or auxiliary bar (Figs. 1 and 2) comprises a central or rearwardly bowed portion 5, and rearwardly extending end portions 6, each having an eye $6^a$, the eyes being interposed between the eyes on the adjacent ends of the bars 4, and connected thereto by bolts 7.

Interposed between the bar 5, 6 and the bars 4 is a fourth bar, the last-mentioned bar having a central portion $8^a$ projected between and secured to the central portions of the bars 4 by means of clamping plates 9 and rivets 10. The fourth bar is a substantially flat V in shape, having outwardly and rearwardly extending main portions $8^b$ adapted to bear against the portions 6 of the rear or auxiliary bar and being engaged by the clamps 2, the said clamps securing the parts $8^b$ in contact with the parts 6.

In the operation of a bumper constructed as described, if a severe blow is delivered to the impact section, especially between the arms 1, 1, the central portion of said bars will be bent backwardly, this action being resisted by the fourth bar 8—$8^b$. This bar checks the rearward movement of the bars 4, the parts $8^b$ sliding under friction through the clamps 2. If the blow is of sufficient severity, when the bars 4 and 8—$8^b$ shall have been bent backwardly into the zone of action of the part 5 of the auxiliary bar, a further checking action of the rearward movement of the bars will be offered by this rear bar. Under further deflection of the bumper, the part 5 will be forced rearwardly by the parts in front engaging the same and this movement will be checked by the frictional drag of the parts 6 and $8^b$ through the clamps 2.

In Fig. 3, there is shown a modification of the invention wherein the rear or auxiliary bar is not deflected rearwardly at its central portion but extends substantially straight from end to end through the clamps 2 and across the space therebetween. The bumpers being alike in all other respects, the parts of the bumper shown in Fig. 3 are designated by the same references that are applied to the corresponding parts of the said bumper in Figs. 1 and 2.

Having thus described our invention, what we claim is:—

1. A bumper comprising a pair of vertically spaced impact bars, a rear or auxiliary bar connected to the ends of the impact bars and having its central portion spaced from said bars, a reinforcing bar interposed between the impact and auxiliary bars and having its central portion projecting toward and secured to the impact bars, said reinforcing bar having bearing portions slidably engaging the auxiliary bar, means for frictionally clamping the said portions of the reinforcing bar to the auxiliary bar, and means for pivotally supporting the said bumper.

2. A bumper comprising a pair of vertically spaced impact bars, a rear or auxiliary bar connected to the ends of the impact bars and having its central portion spaced from said bars, a reinforcing bar having its central portion projected toward and secured to the impact bars, said reinforcing bar having bearing portions slidably engaging the auxiliary bar, means for frictionally clamping the said portions of the reinforcing bar to the auxiliary bar, and means including the said clamping means for pivotally supporting the bumper.

3. A bumper comprising a pair of vertically spaced impact bars, a rear or auxiliary bar connected to the ends of the impact bars and having its central portion spaced from said bars, a reinforcing bar having its central portion secured to the impact bars, means for frictionally clamping the reinforcing bar to the auxiliary bar, and means for pivotally supporting the bumper.

4. A bumper comprising a pair of vertically spaced impact bars, a rear or auxiliary bar connected to the ends of the impact bars and having its central portion spaced from such bars, a reinforcing bar interposed between the impact and auxiliary bars and having its central portion projecting toward and secured to the impact bars, said reinforcing bar having bearing portions slidably engaging the auxiliary bar, a clamping device for securing in frictional engagement the interengaging portions of the auxiliary bar and of the rear bar, and a pivotal support for each of said clamping devices.

5. A bumper comprising a pair of vertically spaced impact bars, a rear or auxiliary bar connected to the ends of the impact bars and having its central portion spaced from such bars, a reinforcing bar interposed between the impact and auxiliary bars and having its central portion projecting toward and secured to the impact bars, said reinforcing bar having bearing portions slidably engaging the auxiliary bar, clamping devices for securing in frictional engagement the interengaging portions of the reinforcing and auxiliary bars, each clamping device embracing such portions of the said bars and extending rearwardly therebeyond, and arms for supporting the bumper from the vehicle and each pivotally connected to the rearwardly extending portions of the said clamping devices.

In testimony whereof, we hereunto affix our signatures.

HERBERT S. JANDUS.
CREMER F. BROWN.